US012739888B2

(12) United States Patent
Hu

(10) Patent No.: US 12,739,888 B2
(45) Date of Patent: Sep. 15, 2026

(54) COMMUNICATION METHOD, TERMINAL DEVICE AND NETWORK DEVICE

(71) Applicant: GUANGDONG OPPO MOBILE TELECOMMUNICATIONS CORP., LTD., Dongguan (CN)

(72) Inventor: Yi Hu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 304 days.

(21) Appl. No.: 18/413,428

(22) Filed: Jan. 16, 2024

(65) Prior Publication Data

US 2024/0155692 A1 May 9, 2024

Related U.S. Application Data

(63) Continuation of application No. PCT/CN2021/111454, filed on Aug. 9, 2021.

(51) Int. Cl.

*H04W 74/08* (2024.01)
*H04W 8/22* (2009.01)
*H04W 74/0833* (2024.01)

(52) U.S. Cl.

CPC ......... *H04W 74/0833* (2013.01); *H04W 8/22* (2013.01); *H04W 74/0866* (2013.01)

(58) Field of Classification Search

None

See application file for complete search history.

(56) References Cited

U.S. PATENT DOCUMENTS

| | | | | |
|---|---|---|---|---|
| 2019/0394770 | A1 | 12/2019 | Wang | |
| 2022/0183054 | A1* | 6/2022 | Luo | H04W 72/542 |
| 2024/0063894 | A1* | 2/2024 | Vogedes | H04B 7/18504 |
| 2024/0090018 | A1* | 3/2024 | Maamari | H04W 74/0833 |

FOREIGN PATENT DOCUMENTS

| | | | |
|---|---|---|---|
| CN | 108307378 | A | 7/2018 |
| CN | 111615186 | A | 9/2020 |
| CN | 111770565 | A | 10/2020 |
| CN | 111867084 | A | 10/2020 |
| CN | 112314016 | A | 2/2021 |

(Continued)

OTHER PUBLICATIONS

NEC. "Impact of pre-compensation on RACH capacity for NTN", 3GPP TSG-RAN WG2 Meeting #111 electronic, R2-2007519, Aug. 28, 2020(Aug. 28, 2020).

(Continued)

*Primary Examiner* — Robert M Morlan

(74) *Attorney, Agent, or Firm* — Ladas & Parry, LLP

(57) ABSTRACT

A communication method includes that: a terminal device receives configuration information from a network device, where the configuration information indicates a random access resource for an uplink carrier corresponding to a first-type terminal device and a random access resource for an uplink carrier corresponding to a second-type terminal device; and the terminal device initiates random access based on the configuration information. A terminal device and a network device are also provided.

19 Claims, 11 Drawing Sheets

(56) References Cited

FOREIGN PATENT DOCUMENTS

| | | | |
|---|---|---|---|
| WO | 2021032285 | A1 | 2/2021 |
| WO | 2023015406 | A1 | 2/2023 |

OTHER PUBLICATIONS

International Search Report in the international application No. PCT/CN2021/111454, mailed on Mar. 29, 2022, 5 pages with English translation.

Written Opinion of the International Search Authority in the international application No. PCT/CN2021/111454, mailed on Mar. 29, 2022, 6 pages with English translation.

"3rd Generation Partnership Project; Technical Specification Group Radio Access Network; Solutions for NR to support non-terrestrial networks (NTN) (Release 16)", 3GPP TR 38.821 V1.0.0 (Dec. 2019).

* cited by examiner

COMMUNICATION METHOD, TERMINAL DEVICE AND NETWORK DEVICE

CROSS-REFERENCE TO RELATED APPLICATION

This application is a U.S. continuation application of International Application NO. PCT/CN2021/111454, entitled "COMMUNICATION METHOD AND APPARATUS" and filed on Aug. 9, 2021, the disclosure of which is incorporated by reference herein in its entirety.

TECHNICAL FIELD

The present disclosure relates to the technical field of communications, and in particular, to a method for communication, a terminal device and a network device.

BACKGROUND

Compared with a cellular network adopted in the traditional New Radio (NR), a signal propagation delay between a terminal device and a satellite in a non-terrestrial network (NTN) is greatly increased. Due to a large coverage area of a satellite, signal transmission delays between different terminal devices within a coverage area of a same satellite and this satellite are quite different according to different positions, which may lead to a problem of preamble receiving window ambiguity on a network side of NTN.

In the existing random access channel (RACH) resource configuration methods, in order to avoid the problem of preamble receiving window ambiguity, a longer RACH occasion (RO) interval may be set, so as to ensure that a time interval between adjacent or consecutive ROs in a time domain is not less than the length of a RACH receiving window.

However, unlike a terminal device without a timing advance (TA) pre-compensation capability, a terminal device with the TA pre-compensation capability may estimate a TA and send a preamble using the estimated TA. Since the TA has been adjusted when sending the preamble, the network side does not need to expand the RACH receiving window by using a longer RO interval. On the contrary, the longer RO interval will lead to a reduction in RACH capacity. Therefore, the existing random access resource configuration methods can not meet the RACH resource configuration requirements of different types of terminal devices at the same time, which leads to a problem of random access.

SUMMARY

Embodiments of the present disclosure provide a method for communication to solve the problem that the RACH resource configuration requirements of different types of terminal devices can not be met at the same time in the related art.

In a first aspect of the present disclosure, a method for communication is provided. The method includes the following operations.

A terminal device receives configuration information sent by a network device. The configuration information indicates a random access resource for an uplink carrier corresponding to a first-type terminal device and a random access resource for an uplink carrier corresponding to a second-type terminal device.

The terminal device initiates random access based on the configuration information.

In a second aspect of the present disclosure, a method for communication is provided. The method includes the following operations.

A network device sends configuration information to a terminal device. The configuration information indicates a random access resource for an uplink carrier corresponding to a first-type terminal device and a random access resource for an uplink carrier corresponding to a second-type terminal device.

In a third aspect of the present disclosure, a terminal device is provided. The terminal includes a processor, a memory, a transmitter and an interface for communicating with the network device.

The memory stores computer executable instructions.

The processor executes the computer executable instructions stored in the memory causing the processor to perform the communication method of the first aspect.

In a fourth aspect of the present disclosure, a network device is provided. The network device includes a processor, a memory, a transmitter and an interface for communicating with the terminal device.

The memory stores computer executable instructions.

The processor executes the computer executable instructions stored in the memory causing the processor to perform the communication method of the second aspect.

Provided in embodiments of the present disclosure are a communication method, a terminal device and a network device. A terminal device first receives configuration information sent by a network device, where the configuration information indicates a random access resource for an uplink carrier corresponding to a first-type terminal device and a random access resource for an uplink carrier corresponding to a second-type terminal device. The terminal device then initiates random access based on the configuration information. In this way, random access resources for at least one uplink carrier are respectively configured for the first-type terminal device and the second-type terminal device, thereby avoiding the problem of random access caused by configuration requirements of the first-type terminal device and the second-type terminal device being different.

BRIEF DESCRIPTION OF THE DRAWINGS

In order to more clearly illustrate the technical solutions of the present disclosure or the related art, a brief description will be given below of the accompanying drawings required for use in the description of embodiments or the related art. It will be apparent that the accompanying drawings in the following description are some embodiments of the present disclosure, from which other accompanying drawings may be obtained without creative effort by those ordinarily skilled in the art.

DETAILED DESCRIPTION

Figure 1:
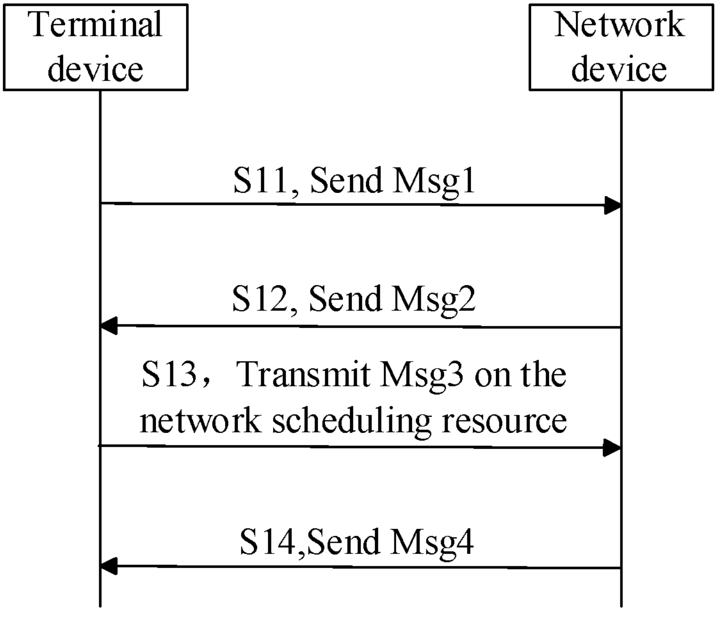
FIG. 1 is a schematic flow chart of a competition-based random access procedure according to an embodiment of the present disclosure.

In order to make the object, technical solution and advantages of the present disclosure clearer, the technical solution of embodiments of the present disclosure will be clearly and completely described in conjunction with the accompanying drawings in embodiments of the present disclosure below, and it will be obvious that the described embodiments are part of embodiments of the present disclosure, but not all of them. Based on embodiments in the present disclosure, all other embodiments obtained by those ordinarily skilled in the art without making creative efforts fall within the scope of protection of the present disclosure.

The terms "first", "second", etc. in the specification, claims and above accompanying drawings of embodiments of the present disclosure are used to distinguish similar objects and are not necessary used to describe a particular order or priority. It should be understood that such used data may be interchanged when appropriate, so that embodiments of the present disclosure described herein can be implemented, for example, in an order other than those illustrated or described herein. In addition, the terms "including" and "comprising" and any variations thereof are intended to cover non-exclusive inclusion, for example, processes, methods, systems, products, or devices that contain a series of steps or units do not need to be limited to those steps or units clearly listed, but may include other steps or units not explicitly listed or inherent to such processes, methods, products, or devices.

It should be understood that terms "system" and "network" in the present disclosure may usually be exchanged. In the present disclosure, the term "and/or" is only an association relationship describing associated objects and represents that three relationships may exist. For example, A and/or B may represent three conditions: i.e., independent existence of A, existence of both A and B, and independent existence of B. In addition, character "/" in the present disclosure usually represents that previous and next associated objects form an "or" relationship.

The technical solutions of embodiments of the present disclosure will be described below in conjunction with the accompanying drawings in embodiments of the present disclosure. It is obvious that the described embodiments are part of embodiments of the present disclosure, but not all of them. Based on embodiments in the present disclosure, all other embodiments obtained by those ordinarily skilled in the art without making creative efforts fall within the scope of protection of the present disclosure.

The NTN technology is described first below.

At present, the 3rd generation partnership project (3GPP) is studying the NTN technology. NTN generally provides communication services to ground users by means of satellite communication. Compared with terrestrial cellular network communication, satellite communication has the following advantages: Firstly, satellite communication is not limited by regions of the users. General terrestrial communication may not cover areas such as oceans, mountains, deserts, etc., where communication devices cannot be set up or communication coverage is not available due to sparse population. However, for the satellite communication, since one satellite may cover a large area of ground and the satellite may orbit around the earth in orbital motion, theoretically, every corner on the earth can be covered by the satellite communication. Secondly, the satellite communication has great social value. The satellite communication can cover remote mountainous regions, and poor and underdeveloped countries or regions at a lower cost, so that in these regions, advanced voice communication and mobile Internet technology can be enjoyed, which is conducive to narrowing the digital divide with developed regions and promoting the development of these regions. Thirdly, the satellite communication distance is long, and the communication cost is not increase significantly with the increase of communication distance. Finally, the satellite communication has high stability and may not be limited by natural disasters.

At present, communication satellites in NTN technology may be divided into low-earth orbit (LEO) satellites, medium-earth orbit (MEO) satellites, geostationary earth orbit (GEO) satellites and high elliptical orbit (HEO) satellites according to different orbital altitudes. Here, LEO satellites and GEO satellites are the main research directions.

The altitude of the LEO satellites ranges from 500 km to 1500 km, and the corresponding orbital period is about 1.5 hours to 2 hours. Signal propagation delay of single-hop communication between users is generally less than 20 ms. The maximum satellite visibility time is 20 minutes. The signal propagation distance is short, link loss is small, and transmission power requirements for the terminals of users are not high.

The orbital altitude of the GEO satellites is 35,786 km and the rotation period around the Earth is 24 hours. The signal propagation delay of single-hop communication between users is generally 250 ms.

In order to ensure the coverage of satellites and improve the system capacity of the entire satellite communication system, a satellite covers the ground with multiple beams, and one satellite may form dozens or even hundreds of beams to cover the ground. A satellite beam can cover the ground area with a diameter of dozens to hundreds of kilometers.

The random access procedure is illustrated below.

The random access procedure is mainly triggered by the following events: the terminal device establishes a wireless connection when initially accessed, that is, the terminal device transitions from an idle state (RRC_IDLE) to a connected state (RRC_CONNECTED); Radio Resource Control (RRC) connection re-establishment procedure, so that the terminal device re-establishes the wireless connection after the radio link fails; the terminal device needs to establish uplink synchronization with a new cell so as to be handed over to the new cell; in RRC_CONNECTED state, downlink (DL) data arrives, and up link (UL) synchronization status is "non-synchronized" at this time; in RRC_CONNECTED state, UL data arrives, and at this time, UL synchronization status is "non-synchronized" or there is no Physical Uplink Control Channel (PUCCH) resource for scheduling request (SR) available; and SR failure.

Long Term Evolution (LTE) technology supports two kinds of random access modes, one is a competition-based random access mode, and the other is a non-competition-based random access mode.

FIG. 1 is a schematic flow chart of a competition-based random access procedure according to an embodiment of the present disclosure. As shown in FIG. 1, the competition-based random access procedure may include the following operations:

In S11, a terminal device sends a message 1 (Msg1) to a network device.

Here, the Msg1 may include a random access preamble.

In this operation, the terminal device may select a Physical Random Access Channel (PRACH) resource and send the selected preamble on the selected PRACH. Based on the preamble, the network device may estimate uplink timing and a size of the grant required by the terminal to transmit the message 3 (Msg3).

In S12, the network device sends a message 2 (Msg2) to the terminal device.

In this operation, after sending the Msg1, the terminal device may start a random access response window (ra-ResponseWindow), and monitor a Physical Downlink Control Channel (PDCCH) scrambled by a random access radio network temporary identifier (RA-RNTI) within the ra-ResponseWindow. Here, RA-RNTI is related to PRACH time-frequency resources used by the terminal device to send the Msg1.

After receiving the PDCCH scrambled by RA-RNTI successfully, the terminal device may obtain a Physical Downlink Shared Channel (PDSCH) scheduled by the PDCCH. The PDSCH carries a Random Access Response (RAR), and the RAR specifically contains the following information: backoff indicator (BI) parameters, which are contained in a subheader of the RAR and indicate the backoff time for re-transmission of Msg1; a random access preamble indication (RAPID), which is contained by the network device in the RAR in response to the received preamble index; a timing advance group (TAG), which is contained in a payload in the RAR and is used for adjusting the uplink timing; an Uplink grant (UL grant), which is used for scheduling the uplink resource indication of the Msg3; and a temporary cell-radio network identifier (TC-RNTI), which is used for scrambling PDCCH for a Msg4 (initial access).

If the terminal receives the PDCCH scrambled by RAR-RNTI and the RAR contains the preamble index sent by itself, then it is considered that the terminal device has successfully received the random access response.

In S13, the terminal device transmits the message 3 (Msg3) on a resource scheduled by the network device.

Here, the Msg3 is used to notify a network of a trigger event of the RACH procedure. Exemplarily, if the trigger event is the initial access random procedure, the Msg 3 carries an identity of the terminal device and establishment cause; if the trigger event is the Radio Resource Control (RRC) re-establishment, the Msg 3 carries an identity of the terminal device in the connected state and the establishment cause.

In S14, the network device sends the message 4 (Msg4) to the terminal device.

Here, the Msg4 has two functions, the first function is for contention conflict resolution, and the second function is for the network device to transmit RRC configuration messages to the terminal device.

Here, there are two modes for contention conflict resolution: one mode is that if the terminal device carries a cell network identifier (C-RNTI) in the Msg3, then the Msg4 is scheduled by PDCCH scrambled by C-RNTI. The other mode is that if the terminal device does not carry C-RNTI in the Msg3, for example, during initial access, then the Msg4 is scheduled by PDCCH scrambled by TC-RNTI. The conflict resolution is performed by the terminal device receiving PDSCH of the Msg4 and matching a service data unit (SDU) of a common control channel (CCCH) in the PDSCH.

Figure 2:
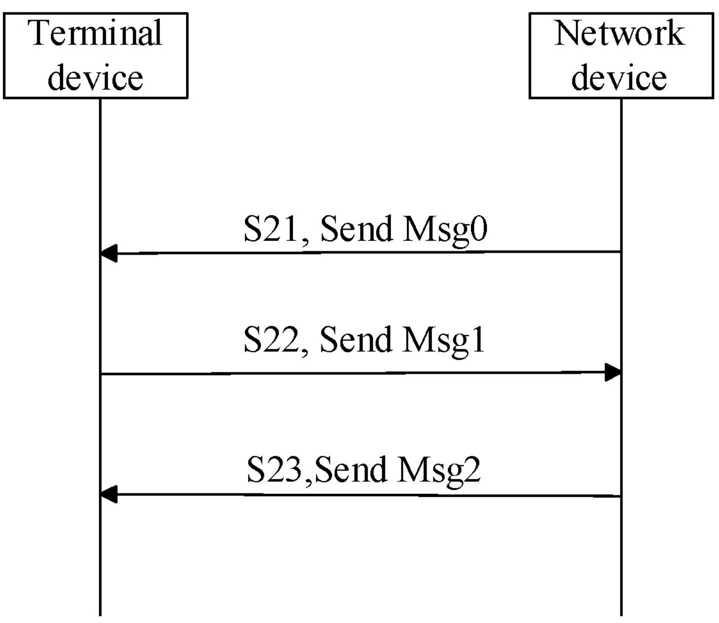
FIG. 2 is a schematic flow chart of a non-competition-based random access procedure according to an embodiment of the present disclosure.

FIG. 2 is a schematic flow chart of a non-competition-based random access procedure according to an embodiment of the present disclosure. As shown in FIG. 2, the non-competition-based random access procedure may include the following operations:

In S21, a network device sends a message 0 (Msg0) to a terminal device.

Here, the Msg0 indicates a random access preamble.

In S22, the terminal device sends a message 1 (Msg1) to the network device.

For non-competition-based random access, the PRACH resource and preamble may be specified by a base station.

In S23, the network device sends a message 2 (Msg2) to the terminal device.

For non-competition-based random access, after the terminal device successfully receives the Msg2, the random access procedure ends. For contention-based random access, after the terminal device successfully receives the Msg2, the terminal device needs to continue transmitting the Msg3 and receiving the Msg4.

The technical terms, technical effects, technical features and alternative implementations of S22-S23 may be understood with reference to S11-S12 shown in FIG. 1, and the repetitive contents will not be repeated here.

It should be noted that from the above random access procedure, it can be seen that the main purpose of random access is to enable uplink synchronization between the terminal device and the cell. In the random access procedure, the network device may determine the moment when the terminal device sends the preamble according to a RACH time-frequency resource used to receive the preamble from the terminal device, thereby determining an initial TA of the terminal device according to the sending moment and receiving moment of the preamble, and informing the determined initial TA to the terminal device through the RAR.

The determination of an initial TA in NTN is illustrated below.

Based on the current discussion of NTN standardization, two types of terminal devices will be supported by NTN, one type is a terminal device without a TA pre-compensation capability (or a positioning capability), and the other type is a terminal device with the TA pre-compensation capability (or the positioning capability). For these two types of terminal devices, the determination methods of the initial TA are different.

For the terminal device without the TA pre-compensation capability, the network device will broadcast a common TA based on a signal transmission delay between perigee and the base station. For regenerative payload, the common TA=2*d0/c; and for bend-pipe payload, TA=2*(d0+d0_F)/c. The terminal device sends the preamble using the broadcast public TA, and the network device then indicates a terminal device-specific TA (i.e., UE-specific TA) value to the terminal device in the RAR, so that the initial TA of the terminal device is a result of the accumulation of the broadcast public TA and the UE-specific TA indicated in the RAR.

For the terminal device with the TA pre-compensation capability, the random access procedure includes: the terminal device estimates its own TA based on the positioning capability and sends the msg1 using the TA estimated by itself. The network device determines a TA adjustment value of the terminal device after receiving the msg1 and indicates the TA adjustment value to the terminal device through the msg2. Since the network device does not know the exact TA value of the terminal device at this time, the network device may schedule a resource for the msg3 of the terminal device according to a maximum uplink scheduling delay. The terminal device adjusts the TA based on the received indication in the RAR and sends the msg3 on an uplink resource scheduled by the network device. The network device may determine the initial TA used by the terminal device after receiving the msg3 of the terminal device. Since then, a network side and a terminal side have the same understanding of the TA value of the terminal device.

The coverage level of narrow band Internet of things (NB-IoT) is illustrated below.

In order to support coverage enhancement, coverage enhancement level (CE Level) was introduced in NB-IoT. For NB-IoT, three CE levels such as CE Level 0, CE Level 1 and CE Level 2 are defined, which may correspond and resist signal attenuation of 144 dB, 154 dB and 164 dB respectively. Here, CE Level 0 is referred to as normal coverage, and the rest of CE Levels are referred to as enhanced coverage. The uplink and downlink transmission between the network device and the NB-IoT terminal will select the corresponding signal repeat transmission times according to the CE Level where the NB-IoT terminal is.

Herein, the method for determining an initial coverage level of the terminal device in a random access initialization stage is as follows:

If this random access is triggered by a PDCCH order, and the PDCCH order indicates the initial coverage level, or if for the NB-IoT terminal, it is indicated the initial narrow physical random access channel repetition times; or if the upper layer is configured with the initial coverage level, then the terminal device is considered to be at the initial coverage level indicated by the network. Otherwise, the terminal device determines its own initial coverage level according to the reference signal receiving power (RSRP) measurement as follows:

If a RSRP threshold corresponding to CE Level 3 is configured at the upper layer, the RSRP measured by the terminal device is lower than the RSRP threshold corresponding to CE Level 3, and the terminal device supports CE Level 3, then the terminal device is considered to be at CE Level 3.

Otherwise, if a RSRP threshold corresponding to CE Level 2 is configured at the upper layer, the RSRP measured by the terminal device is lower than the RSRP threshold corresponding to CE Level 2, and the terminal device supports CE Level 2, then the terminal device is considered to be at CE Level 2.

Otherwise, if a RSRP threshold corresponding to CE Level 1 is configured at the upper layer, the RSRP measured by the terminal device is lower than the RSRP threshold corresponding to CE Level 1, and the terminal device supports CE Level 1, then the terminal device is considered to be at CE Level 1.

Otherwise, the terminal device is considered to be at CE Level 0.

It should be noted that the network configures RACH resources for different coverage levels respectively, and the higher the coverage level, the greater the corresponding preamble repeated transmission times.

A non-anchor carrier in NB-IoT is illustrated below.

In order to improve the paging and capacity of RACH, the non-anchor carrier is introduced for NB-IoT in related standards. A downlink non-anchor carrier may be used for paging as well as for transmission of the Msg2 and the Msg4 during RACH procedure, while an uplink non-anchor carrier is mainly used for transmission of the Msg1 and the Msg3 during RACH procedure. The network may configure a downlink non-anchor carrier list and an uplink non-anchor carrier list in system information blocks (SIB), and the maximum number of downlink non-anchor carriers and uplink non-anchor carriers that the network may configure is 15.

For each anchor carrier, the network configures 1 RACH resource for each coverage level on the anchor carrier. For each uplink non-anchor carrier, the network may configure 0 or 1 RACH resource for each coverage level on the non-anchor carrier.

To support RACH carrier selection, the network configures a parameter (nprach-ProbabilityAnchor) for each coverage level, which indicates a probability that the terminal device selects to use RACH resources on the uplink anchor carrier (i.e., initiating random access on the uplink anchor carrier).

In the random access initialization stage, for a specific coverage level, if the network configures RACH resources corresponding to this specific coverage level on multiple uplink carriers, then the terminal device will randomly select an uplink carrier from these uplink carriers to send the Msg1. The selection probability of the terminal device on these multiple uplink carriers configured with RACH resources corresponding to the coverage level is as follows:

For an anchor carrier, the probability that the terminal device selects the anchor carrier is nprach-ProbabilityAnchor.

For each non-anchor carrier configured with an RACH resource corresponding to the coverage level, the probability that the terminal device selects the carrier is (1−nprach-ProbabilityAnchor)/N, herein N is the number of non-anchor carriers configured with RACH resources corresponding to the coverage level.

At present, the coverage of NR system is small, and the difference of signal transmission delays between terminal devices at different positions in the same cell and the network device is not big. When terminal devices send the preambles during the random access procedure, the preambles sent by different terminal devices using the same RACH time-frequency resource (i.e., the same RO) arrive at the network device within one RO time. Thus, when the network device receives the preamble, the moment when a User Equipment (UE) sends the preamble can be known, so as to determine the TA of the UE and the RA-RNTI used when sending the RAR to the UE.

Compared with the cellular network used in traditional NR, the signal propagation delay between a terminal device and a satellite in NTN increases greatly. In addition, due to the large coverage area of satellites, for different terminal devices within the coverage area of the same satellite, the signal transmission delays between these terminal devices and the satellite may also be significantly different due to their different positions. According to the discussion on NTN application scenarios in the current standardization process, the maximum difference in signal transmission delays between different terminal devices in an NTN cell and the network device is 10.3 ms. Large difference in signal transmission delays will lead to the preambles sent by different terminal devices, which use the same RACH resources to send the preambles, will arrive at the network device at different times.

Figure 3:
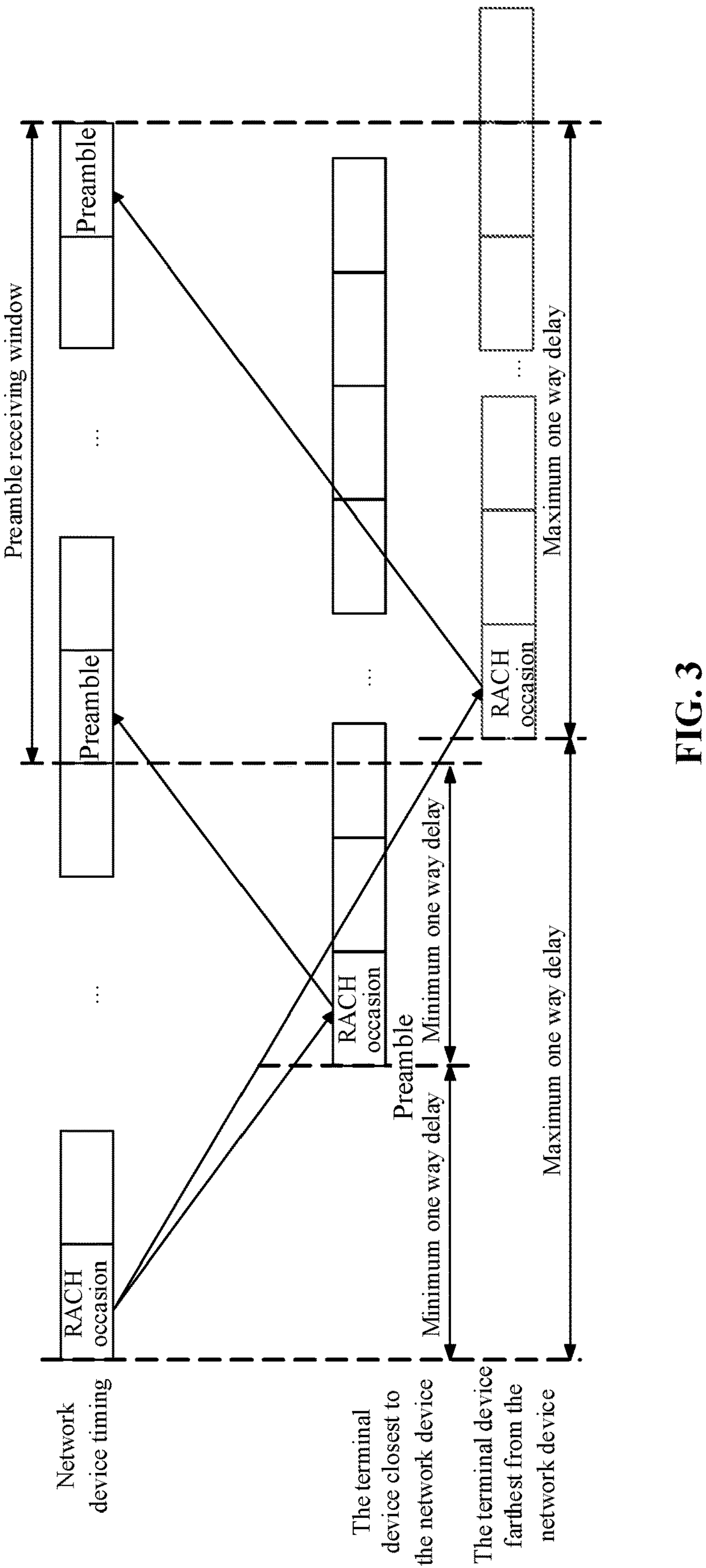
FIG. 3 is a schematic diagram of a preamble receiving window in NTN according to an embodiment of the present disclosure.

FIG. 3 is a schematic diagram of a preamble receiving window in NTN according to an embodiment of the present disclosure. As shown in FIG. 3, in order to ensure that the network device can receive the preambles sent by different terminal devices in the cell, the length of the preamble receiving window on the network device side should be extended to 2*(maximum one way delay−minimum one way delay).

After receiving the preamble, the network device needs to know at which RO the preamble is sent by the terminal device, so as to determine the initial TA of the terminal device. In NTN, since a longer preamble receiving window needs to be introduced, if the time interval between adjacent or consecutive ROs in the time domain is less than the length of the preamble receiving window, the problem that the preamble receiving windows corresponding to ROs at different time overlap in the time domain will occur, so that the network device receives the preamble in the overlapping area of multiple preamble receiving windows, and it is impossible to know which RO the terminal device sends the preamble, and it is impossible to determine the TA of the terminal device.

In the existing RACH resource configuration methods, in order to avoid the problem of preamble receiving window ambiguity, a longer RO interval may be set, so as to ensure that the time interval between adjacent ROs in the time domain is not less than the length of the RACH receiving window.

However, unlike a terminal device without a TA pre-compensation capability, a terminal device with the TA pre-compensation capability may estimate a TA and send the preamble using the estimated TA. Since the TA has been adjusted when sending the preamble, the network side does not need to expand the RACH receiving window by using a longer RO interval. On the contrary, the longer RO interval will lead to a reduction in RACH capacity. Therefore, the existing random access resource configuration methods can not meet the RACH resource configuration requirements of different types of terminal devices at the same time, which leads to a problem of random access.

In order to solve the above technical problems, an embodiment of the present disclosure provides a communication method and apparatus. The network device configures random access resources of at least one uplink carrier respectively for a first-type terminal device and a second-type terminal device, so that different types of terminal devices adopt different random access resources of at least one uplink carrier for random access, thus avoiding the problem of random access caused by configuration requirements of the first-type terminal device and the second-type terminal device being different.

It should be noted that the technical solutions of embodiments of the present disclosure may be applied to the NTN communication system, which is not limited by embodiments of the present disclosure. The technical solutions may also be applied to a Global System of Mobile communication (GSM) system, a Code Division Multiple Access (CDMA) system, a Wideband Code Division Multiple Access (WCDMA) system, General Packet Radio Service (GPRS), a LTE system, a LTE Frequency Division Duplex (FDD) system, a LTE Time Division Duplex (TDD) system, an Advanced long term evolution (LTE-A) system, a New Radio (NR) system, an evolution system of the NR system, a LTE-based access to unlicensed spectrum (LTE-U) system, an NR-based access to unlicensed spectrum (NR-U) system, a Universal Mobile Telecommunication System (UMTS), a Worldwide Interoperability for Microwave Access (WiMAX) communication system, Wireless Local Area Networks (WLAN), Wireless Fidelity (WiFi), a next generation communication system or other communication systems.

The application scenario of the present disclosure is illustrated in an example below.

Figure 4:
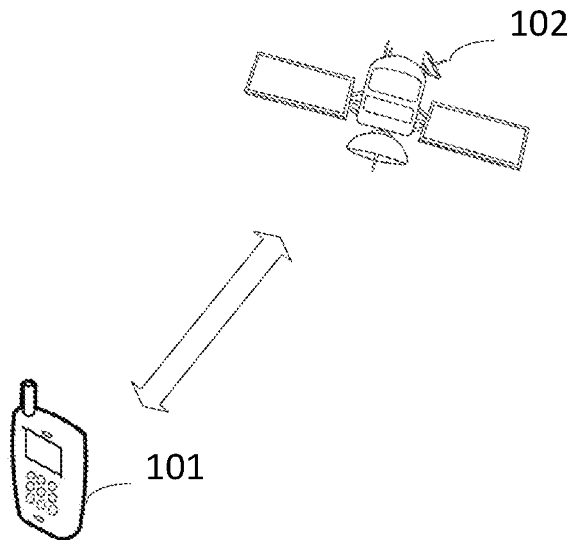
FIG. 4 is a schematic scenario diagram of a communication method according to an embodiment of the present disclosure.

FIG. 4 is a schematic scenario diagram of a communication method according to an embodiment of the present disclosure. As shown in FIG. 4, a network device 102 may send configuration information to a terminal device 101, to indicate a random access resource for an uplink carrier corresponding to a first-type terminal device and a random access resource for an uplink carrier corresponding to a second-type terminal device. The terminal device 101 selects a corresponding random access resource for an uplink carrier according to a terminal type of the terminal device to initiate random access.

Here, the terminal device 101 includes, but is not limited to, a satellite or a cellular phone; a personal communications system (PCS) terminal that may combine cellular radio telephones with data processing, facsimile, and data communication capabilities; a PDA that may include radio telephones, pagers, Internet/Intranet access, Web browsers, notebooks, calendars, and/or Global Positioning System (GPS) receivers; and conventional laptop and/or handheld receivers or other electronic devices including radio telephone transceivers. The terminal device may refer to an access terminal, a UE, a user unit, a user station, a mobile station, a mobile terminal, a remote station, a remote terminal, a mobile device, a user terminal, a terminal, a wireless communication device, a user agent, or a user apparatus. The access terminal may be a cellular telephone, a cordless telephone, a Session Initiation Protocol (SIP) telephone, a Wireless Local Loop (WLL) station, a Personal Digital Assistant (PDA), a handheld device with wireless communication functionality, a computing device or other processing devices connected to a wireless modem, a vehicle-mounted device, a wearable device, a terminal device in a 5G network or a terminal device in a future evolved PLMN, etc.

The network device 102 may provide communication coverage for a particular geographic area and may communicate with terminal devices located within this coverage area. Alternatively, the network device 102 may be a base station in a GSM system or a CDMA system (base transceiver station, BTS), a base station in a WCDMA system (NodeB, NB), an evolved base station in an LTE system (Evolutional Node B, eNB or eNodeB), or a wireless controller in a cloud radio access network (CRAN), or the network device may be a mobile switching center, a relay station, an access point, a vehicle-mounted device, a wearable device, a hub, a switch, a bridge, a router, a network device in a 5G network, or a network device in a future evolved public land mobile network (PLMN), etc.

Taking the terminal device and the network device as examples, the technical solution of embodiments of the present disclosure is described in detail below. The following specific embodiments may be combined with each other, and the same or similar concepts or processes may not be repeated in some embodiments.

Figure 5:
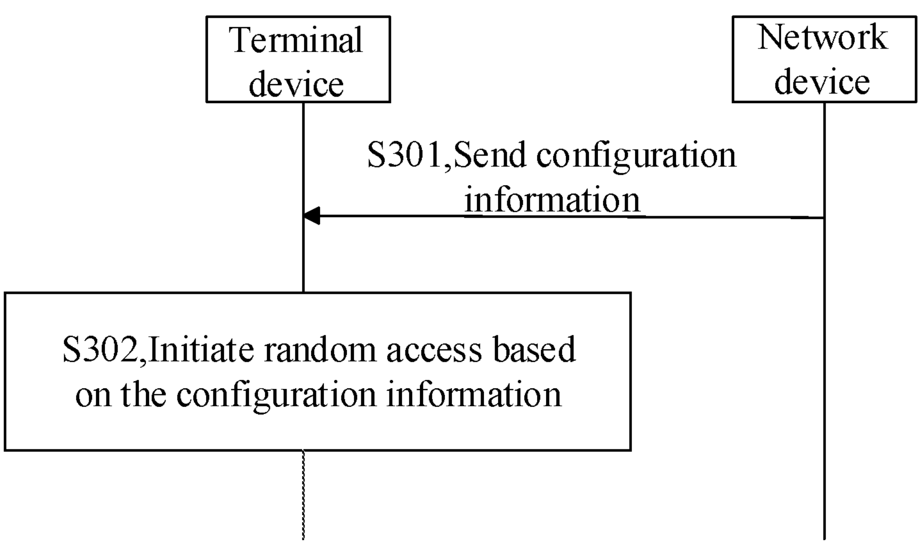
FIG. 5 is a signaling interaction diagram of a communication method according to an embodiment of the present disclosure.

FIG. 5 is a signaling interaction diagram of a communication method according to an embodiment of the present disclosure. The executive body of embodiments of the present disclosure is a terminal device and a network device, and relates to a process of how the network device configures random access resources for the terminal device. As shown in FIG. 5, the method includes the following operations.

In S301, the network device sends configuration information to the terminal device.

Here, the configuration information indicates a random access resource for an uplink carrier corresponding to a first-type terminal device and a random access resource for an uplink carrier corresponding to a second-type terminal device.

It should be understood that embodiments of the present disclosure do not limit the type of the uplink carrier, and in some embodiments, the uplink carrier may include an uplink anchor carrier and an uplink non-anchor carrier.

It should be understood that embodiments of the present disclosure do not limit the dividing mode for the first-type terminal device and the second-type terminal device, and in some embodiments, the first-type terminal device and the second-type terminal device are divided according to at least one of a positioning capability or a timing advance (TA) pre-compensation capability.

Exemplarily, the first-type terminal device and the second-type terminal device may be divided directly according to whether a terminal device has the positioning capability or not. If the terminal device has the positioning capability, the terminal device is a first-type terminal device; otherwise, if the terminal device does not have the positioning capability, the terminal device is a second-type terminal device.

Exemplarily, the first-type terminal device and the second-type terminal device may be divided directly according to whether the terminal device has the TA pre-compensation capability or not. If the terminal device has the TA pre-compensation capability, the terminal device is a first-type terminal device; otherwise, if the terminal device does not have the TA pre-compensation capability, the terminal device is a second-type terminal device. Here, the TA pre-compensation capability may be understood as whether the terminal device can estimate a TA corresponding to a service link between itself and a satellite, obtain a first TA in combination with information such as a common TA broadcast by a network, and use the first TA to carry out TA compensation to send a msg1.

Exemplarily, the first-type terminal device and the second-type terminal device may be divided according to whether the terminal device has both the positioning capability and the TA pre-compensation capability or not. If the terminal device has both the positioning capability and the TA pre-compensation capability, the terminal device is a first-type terminal device; otherwise, if the terminal device does not have both the positioning capability and the TA pre-compensation capability, the terminal device is a second-type terminal device.

It is noted that embodiments of the present disclosure do not limit how the configuration information indicates the random access resource for the uplink carrier corresponding to the first-type terminal device and the random access resource for the uplink carrier corresponding to the second-type terminal device. The following examples provide two implementations for the configuration information.

In the first indication mode, the configuration information specifically indicates that the first-type terminal device and the second-type terminal device respectively correspond to different uplink carriers.

Figure 6:
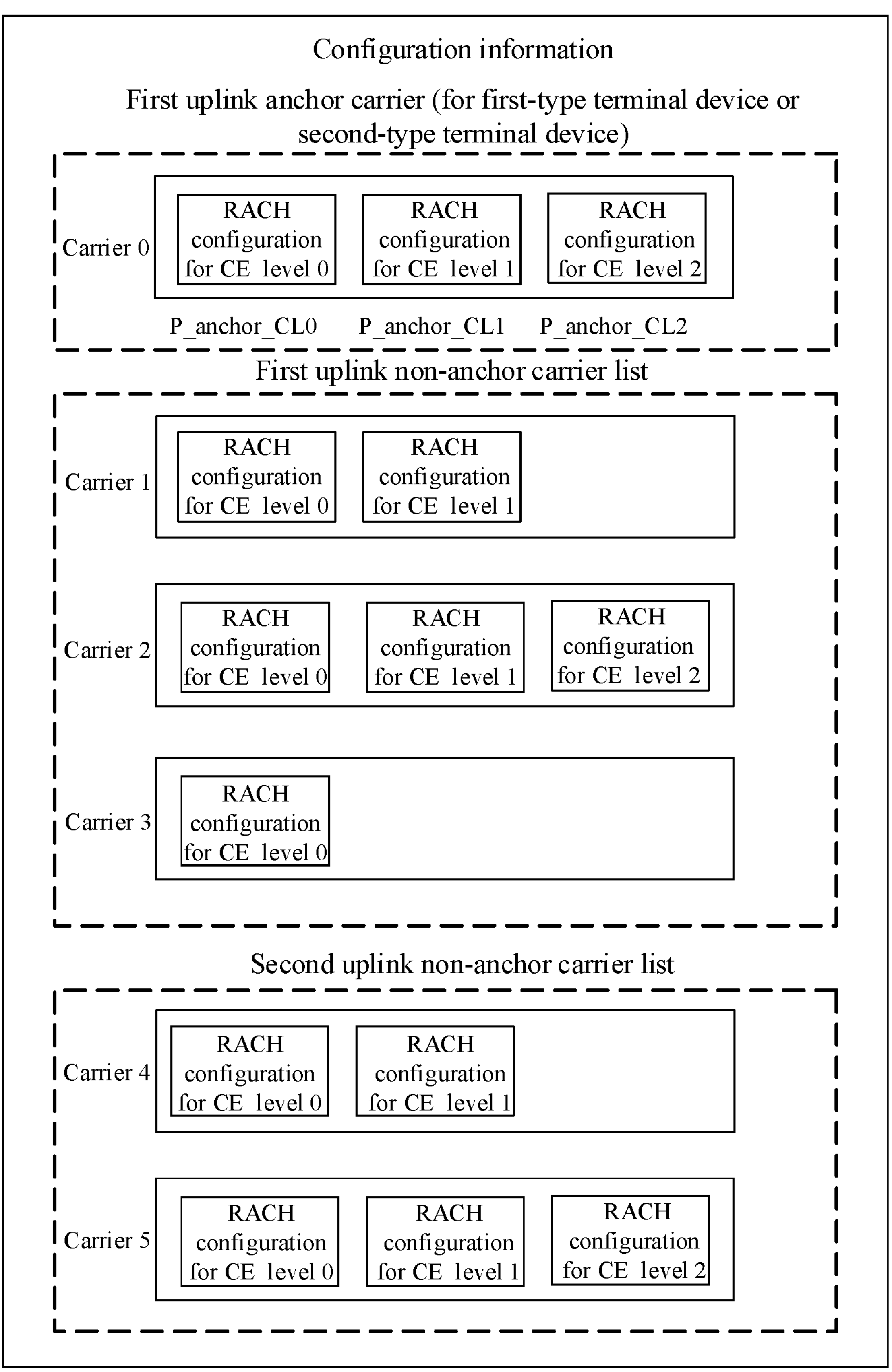
FIG. 6 is a schematic diagram of a configuration mode of configuration information according to an embodiment of the present disclosure.

Exemplarily, FIG. 6 is a schematic diagram of a configuration mode of configuration information according to an embodiment of the present disclosure. As shown in FIG. 6, the configuration information includes a first uplink non-anchor carrier list and a second uplink non-anchor carrier list. Uplink non-anchor carriers in the first uplink non-anchor carrier list is used for the first-type terminal device to initiate random access, and uplink non-anchor carriers in the second uplink non-anchor carrier list is used for the second-type terminal device to initiate random access.

Here, the first uplink non-anchor carrier list and the second uplink non-anchor carrier list do not intersect. That is, a particular uplink carrier can only be configured in one of the first uplink non-anchor carrier list or the second uplink non-anchor carrier list.

Continuing referring to FIG. 6, in the first indication mode, an uplink anchor carrier is used for one of the first-type terminal device or the second-type terminal device, which may be indicated by a network device or may be predefined according to a standard.

It should be noted that in the first indication mode, there is no limitation on the RACH resource configuration mode corresponding to the uplink anchor carrier and each uplink non-anchor carrier. That is, for each coverage level, 1 set of RACH resources is configured for the uplink anchor carrier, and 0 or 1 set of RACH resources is configured for each uplink non-anchor carrier.

In some embodiments, for the first indication mode, the configuration information may further include multiple first parameters. The multiple first parameters are used to respectively characterize probabilities that the first-type terminal device or the second-type terminal device uses a random access resource of the uplink anchor carrier at different coverage levels. Here, the multiple first parameters correspond to the coverage levels one to one, and are respectively configured for each coverage level.

In the second indication mode, the configuration information specifically indicates that the first-type terminal device and the second-type terminal device respectively correspond to different random access resources of an uplink carrier.

Figure 7:
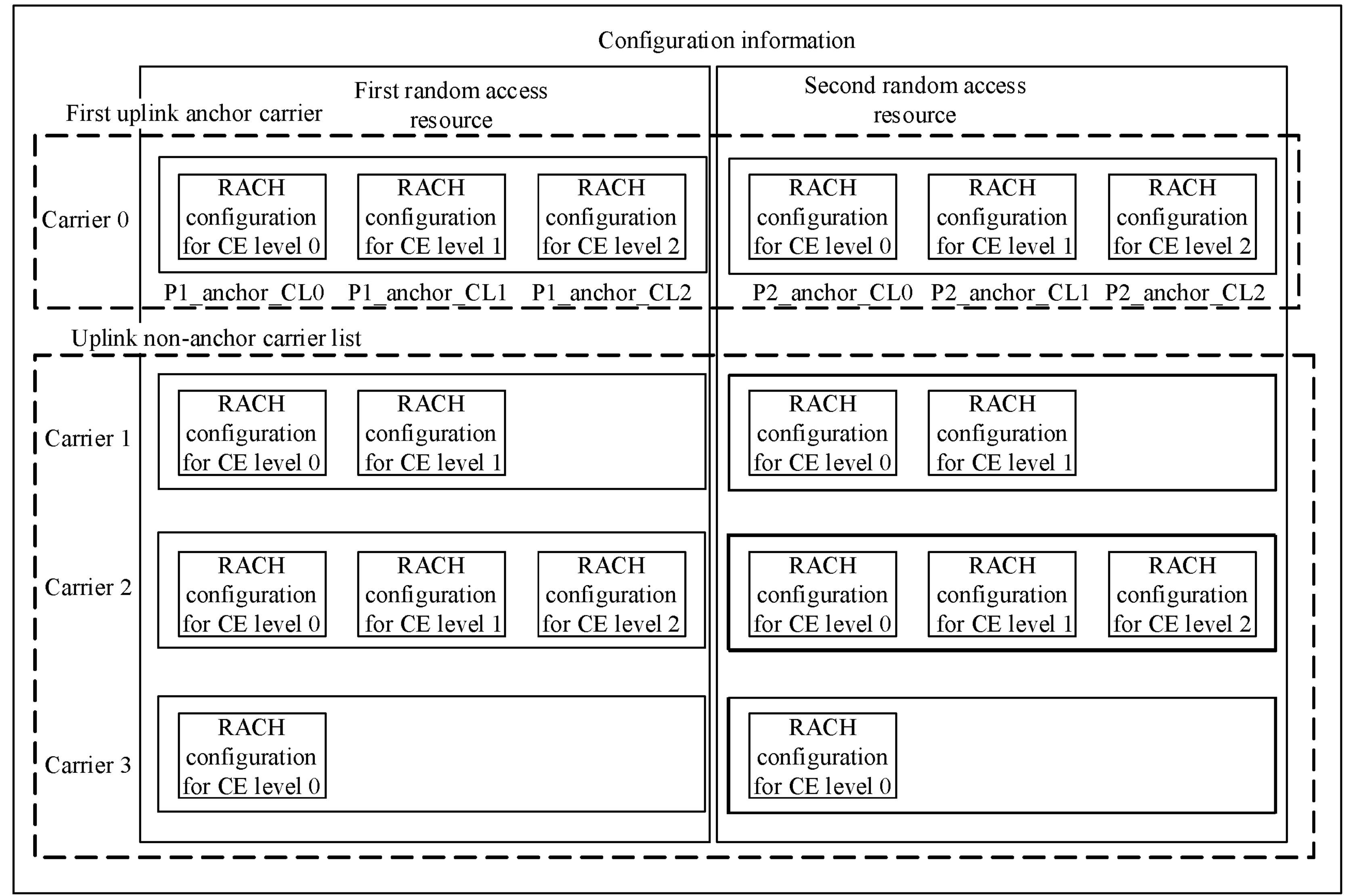
FIG. 7 is a schematic diagram of another configuration mode of configuration information according to an embodiment of the present disclosure.

Exemplarily, FIG. 7 is a schematic diagram of another configuration mode of configuration information according to an embodiment of the present disclosure. As shown in FIG. 7, the configuration information is specifically used to configure a first random access resource of an uplink carrier and a second random access resource of the uplink carrier, the first random access resource is used for the first-type terminal device to initiate random access, and the second random access resource is used for the second-type terminal device to initiate random access.

In some embodiments, in the second indication mode, the configuration information further includes multiple second parameters and multiple third parameters. The multiple second parameters are used to characterize probabilities that the first-type terminal device uses a random access resource of the uplink anchor carrier at different coverage levels, the multiple third parameters are used to characterize probabilities that the second-type terminal device uses a random access resource of the uplink anchor carrier at different coverage levels, and the multiple second parameters and the multiple third parameters correspond to the coverage levels one to one. That is, each coverage level corresponds to a second parameter and a third parameter.

In some embodiments, for the second indication mode, the configuration information may also be configured with an uplink non-anchor carrier list. Embodiments of the present disclosure do not limit how to configure the uplink non-anchor carrier list, which can be specifically set according to the actual situation.

In S302, the terminal device initiates random access based on the configuration information.

In this operation, after receiving the configuration information from the network device, the terminal device may initiate the random access based on the configuration information.

It should be understood that embodiments of the present disclosure do not limit how the terminal device initiates the random access. In some embodiments, during the RACH initialization stage, the terminal device initiates the random access after carrier selection based on the selection probability of each carrier in uplink carriers configured with a RACH resource corresponding to a terminal type of the terminal device.

Exemplarily, the terminal device may first determine a set of available random access resources of an uplink carrier according to the terminal type of the terminal device and the configuration information. Then, the terminal device determines a first probability of selecting to use random access resources of the uplink anchor carrier and a second probability of selecting to use random access resources of the uplink non-anchor carrier. Finally, the terminal device selects a random access resource of an uplink carrier to initiate the random access from the set of the available random access resources of the uplink carrier according to the first probability and the second probability.

It should be understood that the first probability and the second probability may employ different configuration methods based on different indication modes of the configuration information.

In some embodiments, if the configuration information specifically indicates that the first-type terminal device and the second-type terminal device respectively correspond to different uplink carriers, then the first probability may be determined based on first indication information, where the first indication information indicates that the uplink anchor carrier is used for the first-type terminal device or the second-type terminal device to initiate random access.

Exemplarily, for a specific coverage level, assuming that the probabilities of the first-type terminal device and the second-type terminal device selecting to use the RACH resource on the uplink anchor carrier are P1_anchor and P2_anchor, respectively, the P1_anchor and P2_anchor may be determined in the following two modes:

In the first mode, the first indication information is defined according to a standard to indicate that the RACH resource on the uplink anchor carrier is used for one of the terminal types. For example, if the standard specifies that the RACH resource on the uplink anchor carrier is used for the first-type terminal device, then P1_anchor=P, and P2_anchor=0.

In the second mode, the network sends the first indication information to indicate that the RACH resource on the uplink anchor carrier is used for one of the terminal types. For example, if the network indicates that the RACH resource on the uplink anchor carrier is used for the first-type terminal device, then P1_anchor=P, and P2_anchor=0; if the network indicates that the RACH resource on the uplink anchor carrier is used for the second-type terminal device, then P1_anchor=0, and P2_anchor=P.

It should be understood that the first indication information may be contained in the configuration information or may be sent independently of the configuration information.

Correspondingly, if the configuration information specifically indicates that the first-type terminal device and the second-type terminal device respectively correspond to different uplink carriers, then the second probability may be determined according to the number of target uplink non-anchor carriers in the first uplink non-anchor carrier list or the second uplink non-anchor carrier list. Here, the target uplink non-anchor carriers are configured with random access resources corresponding to a coverage level.

Exemplarily, for the first-type terminal device and for a specific coverage level, if N1 non-anchor carriers in the first uplink non-anchor carrier list are configured with RACH resources corresponding to the specific coverage level, then the selection probabilities corresponding to the N1 non-anchor carriers configured with RACH resources corresponding to the specific coverage level are equal. For each of the N1 uplink non-anchor carriers configured with RACH resources corresponding to the specific coverage level, the probability that the terminal device selects to use RACH resources on this uplink non-anchor carrier is P1_non-anchor=(1−P1_anchor)/N1.

Exemplarily, for the second-type terminal device and for a specific coverage level, if N2 non-anchor carriers in the second uplink non-anchor carrier list are configured with RACH resources corresponding to the specific coverage level, then the selection probabilities corresponding to the N2 non-anchor carriers configured with RACH resources corresponding to the specific coverage level are equal. For each of the N2 uplink non-anchor carriers configured with RACH resources corresponding to the specific coverage level, the probability that the terminal device selects to use RACH resources on this uplink non-anchor carrier is P2_non-anchor=(1−P2_anchor)/N2.

In some embodiments, if the configuration information specifically indicates that the first-type terminal device and the second-type terminal device respectively correspond to different random access resources of an uplink carrier, then the terminal device may directly determine the first probability based on the second parameter and the third parameter in the configuration information Correspondingly, if the configuration information specifically indicates that the first-type terminal device and the second-type terminal device respectively correspond to different random access resources of an uplink carrier, then the second probability may be determined according to the number of uplink non-anchor carriers configured with first random access resources corresponding to a coverage level or the number of uplink non-anchor carriers configured with second random access resources corresponding to a coverage level.

Exemplarily, for the first-type terminal device and for a specific coverage level, if N1 non-anchor carriers in the uplink non-anchor carrier list are configured with first RACH resources corresponding to the specific coverage level, then the selection probabilities corresponding to the N1 non-anchor carriers configured with first RACH resources corresponding to the specific coverage level are equal. For each of the N1 uplink non-anchor carriers configured with first RACH resources corresponding to the specific coverage level, the probability that the terminal device selects to use RACH resources on this uplink non-anchor carrier is P1_non-anchor=(1−P1_anchor)/N1.

Exemplarily, for the second-type terminal device and for a specific coverage level, assuming that N2 non-anchor carriers in the uplink non-anchor carrier list are configured with second RACH resources corresponding to the specific coverage level, then the selection probabilities corresponding to the N2 non-anchor carriers configured with second RACH resources corresponding to the specific coverage level are equal. For each of the N2 uplink non-anchor carriers configured with second RACH resources corresponding to the specific coverage level, the probability that the terminal device selects to use RACH resources on this uplink non-anchor carrier is P2_non-anchor=(1−P2_anchor)/N2.

In the communication method provided by embodiments of the present disclosure, the terminal device first receives the configuration information sent by the network device, where the configuration information indicates a random access resource for an uplink carrier corresponding to the first-type terminal device and a random access resource for an uplink carrier corresponding to the second-type terminal device. Then, the terminal device initiates random access based on the configuration information. In this way, random access resources for at least one uplink carrier are respectively configured for the first-type terminal device and the second-type terminal device, thereby avoiding the problem of random access caused by configuration requirements of the first-type terminal device and the second-type terminal device being different.

Figure 8:
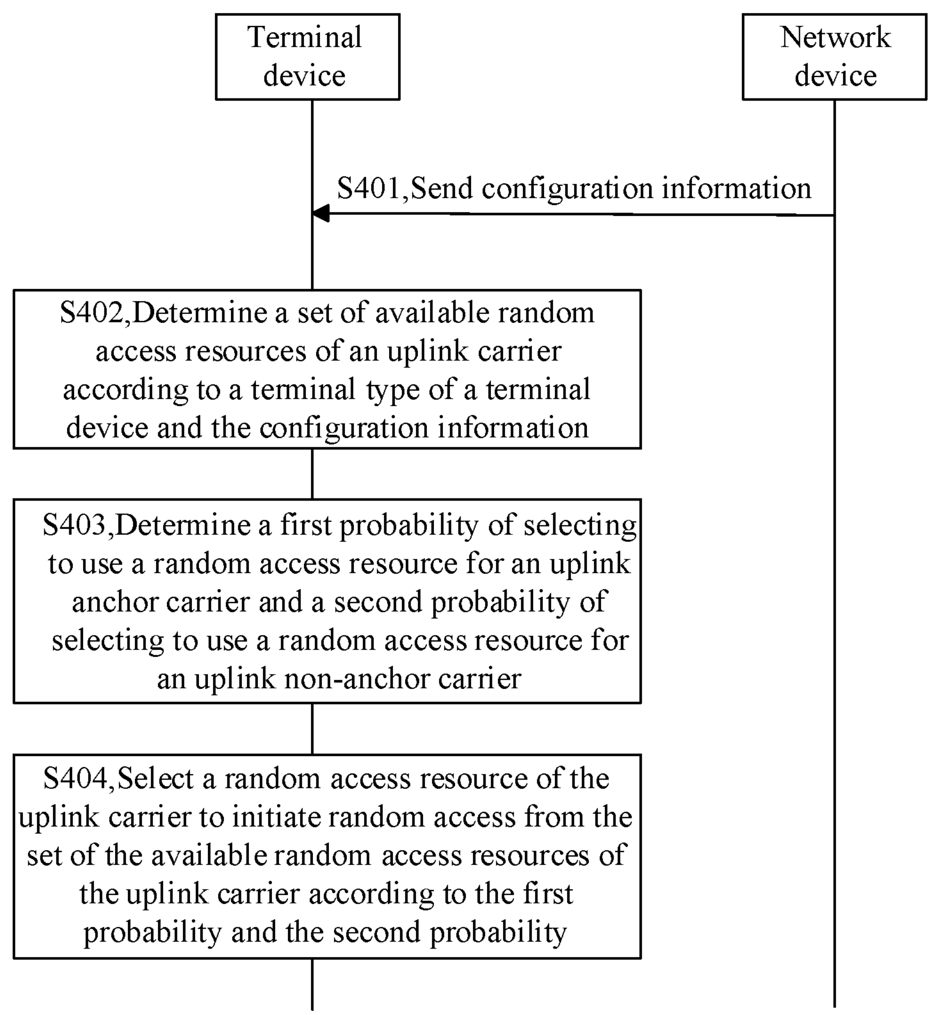
FIG. 8 is a signaling interaction diagram of another communication method according to an embodiment of the present disclosure.

On the basis of the above embodiments, how the terminal device initiates the random access is described in detail below. FIG. 8 is a signaling interaction diagram of another communication method according to an embodiment of the present disclosure. As shown in FIG. 8, the method includes the following operations.

In S401, a network device sends configuration information to a terminal device.

In a possible design, the configuration information indicates a random access resource for an uplink carrier corresponding to a first-type terminal device and a random access resource for an uplink carrier corresponding to a second-type terminal device.

In a possible design, the first-type terminal device and the second-type terminal device are divided according to at least one of a positioning capability or a timing advance (TA) pre-compensation capability.

In a possible design, the uplink carrier includes an uplink anchor carrier and an uplink non-anchor carrier.

In S402, the terminal device determines a set of available random access resources for the uplink carrier according to a terminal type of the terminal device and the configuration information.

In S403, the terminal device determines a first probability of selecting to use a random access resource for the uplink anchor carrier and a second probability of selecting to use a random access resource for the uplink non-anchor carrier.

In S404, the terminal device selects a random access resource of the uplink carrier to initiate the random access from the set of the available random access resources of the uplink carrier according to the first probability and the second probability.

The technical terms, technical effects, technical features and alternative implementations of S401-S404 may be understood with reference to S301-S302 shown in FIG. 5, and the repetitive contents will not be repeated here.

Those ordinarily skilled in the art will appreciate that: all or part of the steps of implementing the above method embodiments may be accomplished by hardware related to program information, the above program may be stored in a computer readable storage medium, and when the program is executed, the steps including the above method embodiments are performed. The aforementioned storage medium includes various medium capable of storing program codes such as ROM, RAM, magnetic disk or optical disk.

Figure 9:
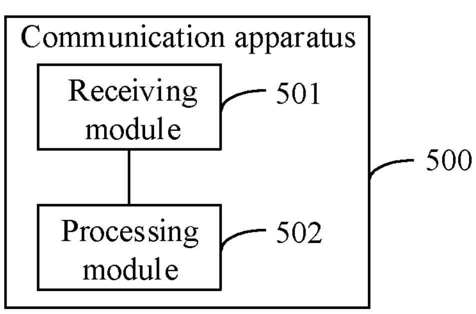
FIG. 9 is a schematic structure diagram of a communication apparatus according to an embodiment of the present disclosure.

FIG. 9 is a schematic structure diagram of a communication apparatus according to an embodiment of the present disclosure. The communication apparatus may be implemented by software, hardware, or a combination of both to perform the communication method on the terminal device side in the above embodiments. As shown in FIG. 9, the communication apparatus 500 includes a receiving module 501 and a processing module 502.

The receiving module 501 is configured to receive configuration information sent by a network device. The configuration information indicates a random access resource for an one uplink carrier corresponding to a first-type terminal device and a random access resource of an uplink carrier corresponding to a second-type terminal device.

The processing module 502 is configured to initiate random access based on the configuration information.

In an optional implementation, the first-type terminal device and the second-type terminal device are divided according to at least one of a positioning capability or a timing advance (TA) pre-compensation capability.

In an optional implementation, the uplink carrier includes an uplink anchor carrier and an uplink non-anchor carrier. The processing module 502 is specifically configured to determine a set of available random access resources for the uplink carrier according to a terminal type of the terminal device and the configuration information; determine a first probability of selecting to use a random access resource for the uplink anchor carrier and a second probability of selecting to use a random access resource for the uplink non-anchor carrier; and select a random access resource of the uplink carrier to initiate the random access from the set of the available random access resources of the uplink carrier according to the first probability and the second probability.

In an optional implementation, the configuration information specifically indicates that the first-type terminal device and the second-type terminal device respectively correspond to different uplink carriers.

In an optional implementation, the configuration information includes a first uplink non-anchor carrier list and a second uplink non-anchor carrier list, uplink non-anchor carriers in the first uplink non-anchor carrier list are used for the first-type terminal device to initiate the random access, and uplink non-anchor carriers in the second uplink non-anchor carrier list are used for the second-type terminal device to initiate the random access.

In an optional implementation, the first uplink non-anchor carrier list and the second uplink non-anchor carrier list do not intersect.

In an optional implementation, the configuration information further includes multiple first parameters, these first parameters are used to respectively characterize probabilities that the first-type terminal device or the second-type terminal device uses a random access resource of the uplink anchor carrier at different coverage levels, and the multiple first parameters corresponding to the coverage levels one to one.

In an optional implementation, the first probability is determined based on first indication information for indicating that the uplink anchor carrier is used for the first-type terminal device or the second-type terminal device to initiate the random access.

In an optional implementation, the first indication information is indicated by the network device or defined according to a standard.

In an optional implementation, the second probability is determined according to a number of target uplink non-anchor carriers in the first uplink non-anchor carrier list or the second uplink non-anchor carrier list, the target uplink non-anchor carriers are uplink non-anchor carriers configured with random access resources corresponding to a coverage level.

In an optional implementation, the configuration information specifically indicates that the first-type terminal device and the second-type terminal device respectively correspond to different random access resources of an uplink carrier.

In an optional implementation, the configuration information is specifically used to configure a first random access resource for the uplink carrier and a second random access resource for the uplink carrier, the first random access resource is used for the first-type terminal device to initiate the random access, and the second random access resource is used for the second-type terminal device to initiate the random access.

In an optional implementation, the configuration information further includes multiple second parameters and multiple third parameters, the multiple second parameters are used to respectively characterize probabilities that the first-type terminal device uses a random access resource of the uplink anchor carrier at different coverage levels, the multiple third parameters are used to respectively characterize probabilities that the second-type terminal device uses a random access resource of the uplink anchor carrier at different coverage levels, and the multiple second parameters and the multiple third parameters correspond to the coverage levels one to one.

In an optional implementation, the second probability is determined according to a number of uplink non-anchor carriers configured with first random access resources corresponding to coverage levels or a number of uplink non-anchor carriers configured with second random access resources corresponding to coverage levels.

The communication apparatus provided by embodiments of the present disclosure may perform the operations of the communication method on the terminal device side in the above embodiments, and its implementation principle and technical effect are similar, which will not be repeated here.

Figure 10:
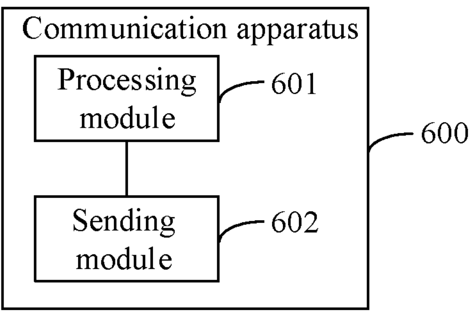
FIG. 10 is a schematic structure diagram of another communication apparatus according to an embodiment of the present disclosure.

FIG. 10 is a schematic structure diagram of another communication apparatus according to an embodiment of the present disclosure. The communication apparatus may be implemented by software, hardware, or a combination of both to perform the communication method on the network device side in the above embodiments. As shown in FIG. 10, the communication apparatus 600 includes a processing module 601 and a sending module 602.

The processing module 601 is configured to determine configuration information.

The sending module 602 is configured to send the configuration information to a terminal device. The configuration information indicates a random access resource for an uplink carrier corresponding to a first-type terminal device and a random access resource for an uplink carrier corresponding to a second-type terminal device.

In an optional implementation, the first-type terminal device and the second-type terminal device are divided according to at least one of a positioning capability or a timing advance pre-compensation capability.

In an optional implementation, the uplink carrier includes an uplink anchor carrier and an uplink non-anchor carrier.

In an optional implementation, the configuration information specifically indicates that the first-type terminal device and the second-type terminal device respectively correspond to different uplink carriers.

In an optional implementation, the configuration information includes a first uplink non-anchor carrier list and a second uplink non-anchor carrier list, uplink non-anchor carriers in the first uplink non-anchor carrier list is used for the first-type terminal device to initiate the random access, and uplink non-anchor carriers in the second uplink non-anchor carrier list is used for the second-type terminal device to initiate the random access.

In an optional implementation, the first uplink non-anchor carrier list and the second uplink non-anchor carrier list do not intersect.

In an optional implementation, the configuration information further includes multiple first parameters, these first parameters are used to respectively characterize probabilities that the first-type terminal device or the second-type terminal device uses a random access resource of the uplink anchor carrier at different coverage levels, and the multiple first parameters corresponding to the coverage levels one to one.

In an optional implementation, the configuration information further includes first indication information for indicating that the uplink anchor carrier is used for the first-type terminal device or the second-type terminal device to initiate the random access.

In an optional implementation, the configuration information specifically indicates that the first-type terminal device and the second-type terminal device respectively correspond to different random access resources of an uplink carrier.

In an optional implementation, the configuration information is specifically used to configure a first random access resource for the uplink carrier and a second random access resource for the uplink carrier, the first random access resource is used for the first-type terminal device to initiate the random access, and the second random access resource is used for the second-type terminal device to initiate the random access.

In an optional implementation, the configuration information further includes multiple second parameters and multiple third parameters, the multiple second parameters are used to respectively characterize probabilities that the first-type terminal device uses a random access resource of the uplink anchor carrier at different coverage levels, the multiple third parameters are used to respectively characterize probabilities that the second-type terminal device uses a random access resource of the uplink anchor carrier at different coverage levels, and the multiple second parameters and the multiple third parameters correspond to the coverage levels one to one.

The communication apparatus provided by embodiments of the present disclosure may perform the operations of the communication method on the network device side in the above embodiments, and its implementation principle and technical effect are similar, which will not be repeated here.

Figure 11:
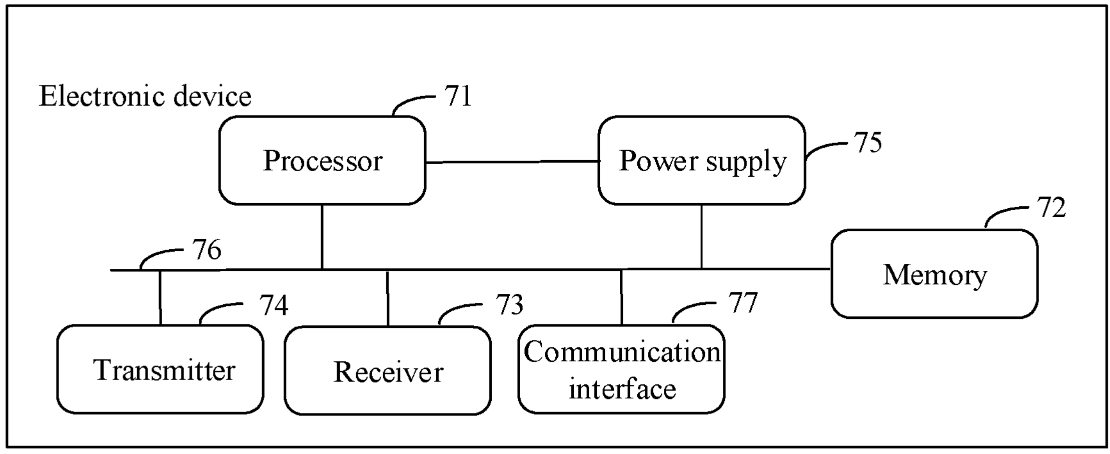
FIG. 11 is a schematic structure diagram of an electronic device according to an embodiment of the present disclosure.

FIG. 11 is a schematic structure diagram of an electronic device according to an embodiment of the present disclosure. As shown in FIG. 11, the electronic device may include: a processor 71 (e.g. CPU), a memory 72, a receiver 73, and a transmitter 74. The receiver 73 and the transmitter 74 are coupled to the processor 71, and the processor 71 controls a receiving operation of the receiver 73 and a sending operation of the transmitter 74. The memory 72 may contain high-speed RAM memory and may also include non-volatile memory NVM, such as at least one disk memory. The memory 72 may store various information for implementing various processing functions and method steps of embodiments of the present disclosure. Alternatively, the electronic device according to an embodiment of the present disclosure may further include: a power supply 75, a communication bus 76, and a communication interface 77. The receiver 73 and the transmitter 74 may be integrated in a transceiver of the electronic device or may be independent transceiver antennas on the electronic device. The communication bus 76 is used to realize communication connection between the elements. The above communication interface 77 is used to realize connection and communication between the electronic device and other peripheral devices.

In an embodiment of the present disclosure, the above memory 72 is used to store computer executable program code which includes information. When the processor 71 executes the information, the processor 71 is enabled to perform the processing operation on the terminal device side in the above method embodiments, the transmitter 74 is enabled to perform the sending operation on the terminal device side in the above method embodiments, and the receiver 73 is enabled to perform the receiving operation on the terminal device side in the above method embodiments. The implementation principle and technical effect are similar, which will not be repeated here.

Alternatively, when the processor 71 executes the information, the processor 71 is enabled to perform the processing operation on the network device side in the above method embodiments, the transmitter 74 is enabled to perform the sending operation on the network device side in the above method embodiments, and the receiver 73 is enabled to perform the receiving operation on the network device side in the above method embodiments. The implementation principle and technical effect are similar, which will not be repeated here.

Embodiments of the present disclosure also provide a communication system, which includes a terminal device and a network device to perform the above communication method.

Embodiments of the present disclosure further provide a chip, which includes a processor and an interface. Here, the interface is used to input and output data or instructions processed by the processor. The processor is used to perform the method provided in the above method embodiments. The chip may be applied in a terminal device or a network device.

The present disclosure also provides a computer-readable storage medium, which may include: a U disk, a mobile hard disk, a Read-Only Memory (ROM), a Random Access Memory (RAM), a magnetic disk or an optical disk and other medium capable of storing program codes. In particular, the computer-readable storage medium stores program information, which is used for the above communication method.

Embodiments of the present disclosure also provide a program, which is used to perform the communication method provided by the above method embodiments when executed by the processor.

Embodiments of the present disclosure also provide a program product, such as a computer-readable storage medium, in which instructions are stored that, when executed by a computer, cause the computer to perform the communication method provided by the above method embodiments.

Embodiments of the present disclosure also provide an apparatus, which may include: interface circuitry and at least one processor in which program instructions involved are executed to cause the communication apparatus to implement the communication method provided by the above method embodiments.

Embodiments of the present disclosure also provide a communication apparatus, which is used to perform the communication method provided by the above method embodiments.

In the above embodiments, it may be implemented in whole or in part by software, hardware, firmware or any combination thereof. When implemented in software, it can be implemented in whole or in part in the form of a computer program product. The computer program product includes one or more computer instructions. When the computer program instructions are loaded and executed on a computer, the processes or functions according to embodiments of the present disclosure are generated in whole or in part. The computer may be a general purpose computer, a special purpose computer, a computer network, or other programmable apparatuses. The computer instructions may be stored in or transmitted from one computer-readable storage medium to another. For example, the computer instructions may be transmitted from one Web site, computer, server, or data center via wired (e.g. coaxial cable, optical fiber, digital subscriber line (DSL)) or wireless (e.g. infrared, wireless, microwave, etc.) mode to another Web site, computer, server, or data center. The computer-readable storage medium may be any usable medium accessible to a computer or a data storage device such as a server, data center, or the like that contains one or more usable medium integration. The usable medium may be magnetic medium (e.g. floppy disk, hard disk, magnetic tape), optical medium (e.g. DVD), or semiconductor medium (e.g. solid state disk (SSD)), etc.

Finally, it should be noted that the above embodiments are only used to illustrate the technical solution of the present disclosure, but not to limit it. Although the present disclosure has been described in detail with reference to the above embodiments, it should be understood by those ordinarily skilled in the art that the technical solution described in the above embodiments may still be modified or some or all of the technical features thereof may be equivalently replaced. These modifications or replacements do not depart the essence of the corresponding technical solution from the scope of the technical solution of embodiments of the present disclosure.

What is claimed is:

1. A method for communication, comprising:

receiving, by a terminal device, configuration information from a network device, wherein the configuration information indicates a random access resource for an uplink carrier corresponding to a first-type terminal device and a random access resource for an uplink carrier corresponding to a second-type terminal device; and initiating, by the terminal device, random access based on the configuration information, wherein the uplink carrier comprises an uplink anchor carrier and an uplink non-anchor carrier, and wherein initiating, by the terminal device, the random access based on the configuration information comprises:

determining, by the terminal device, a set of available random access resources for the uplink carrier according to a terminal type of the terminal device and the configuration information;

determining, by the terminal device, a first probability of selecting to use a random access resource for the uplink anchor carrier and a second probability of selecting to use a random access resource for the uplink non-anchor carrier; and selecting, by the terminal device and according to the first probability and the second probability, a random access resource for the uplink carrier from the set of the available random access resources for the uplink carrier to initiate the random access.

2. The method of claim 1, wherein the first-type terminal device and the second-type terminal device are divided according to at least one of a positioning capability or a timing advance pre-compensation capability.

3. The method of claim 1, wherein the configuration information specifically indicates that the first-type terminal device and the second-type terminal device respectively correspond to different uplink carriers.

4. The method of claim 3, wherein the configuration information comprises a first uplink non-anchor carrier list and a second uplink non-anchor carrier list, uplink non-anchor carriers in the first uplink non-anchor carrier list being used for the first-type terminal device to initiate the random access, and uplink non-anchor carriers in the second uplink non-anchor carrier list being used for the second-type terminal device to initiate the random access.

5. The method of claim 3, wherein the configuration information further comprises a plurality of first parameters, wherein the plurality of the first parameters respectively characterize probabilities that the first-type terminal device or the second-type terminal device uses a random access resource for the uplink anchor carrier at different coverage levels, and the plurality of the first parameters correspond to the coverage levels one to one.

6. The method of claim 3, wherein the first probability is determined based on first indication information for indicating that the uplink anchor carrier is used for the first-type terminal device or the second-type terminal device to initiate the random access.

7. The method of claim 1, wherein the configuration information specifically indicates that the first-type terminal device and the second-type terminal device respectively correspond to different random access resources for an uplink carrier.

8. The method of claim 7, wherein the configuration information is specifically used to configure a first random access resource for the uplink carrier and a second random access resource for the uplink carrier, the first random access resource being used for the first-type terminal device to initiate the random access, and the second random access resource being used for the second-type terminal device to initiate the random access.

9. The method of claim 7, wherein the configuration information further comprises a plurality of second parameters and a plurality of third parameters, the plurality of the second parameters respectively characterizing probabilities of the first-type terminal device using a random access resource for the uplink anchor carrier at different coverage levels, the plurality of the third parameters respectively characterizing probabilities of the second-type terminal device using a random access resource for the uplink anchor carrier at different coverage levels, and the plurality of the second parameters and the plurality of the third parameters both being in one-to-one correspondences with the coverage levels.

10. The method of claim 7, wherein the second probability is determined according to a number of uplink non-anchor carriers configured with first random access resources corresponding to a coverage level or a number of uplink non-anchor carriers configured with second random access resources corresponding to a coverage level.

11. A network device, comprising:

a processor, a memory, a transmitter and an interface for communicating with a terminal device;

wherein the memory stores computer executable instructions; and the processor executes the computer executable instructions stored in the memory, to perform operations comprising:

sending configuration information to a terminal device, wherein the configuration information indicates a random access resource for an uplink carrier corresponding to a first-type terminal device and a random access resource for an uplink carrier corresponding to a second-type terminal device, wherein the uplink carrier comprises an uplink anchor carrier and an uplink non-anchor carrier, and wherein the configuration information is used for the terminal device to initiate random access by:

determining a set of available random access resources for the uplink carrier according to a terminal type of the terminal device and the configuration information;

determining a first probability of selecting to use a random access resource for the uplink anchor carrier and a second probability of selecting to use a random access resource for the uplink non-anchor carrier; and selecting, according to the first probability and the second probability, a random access resource for the uplink carrier from the set of the available random access resources for the uplink carrier to initiate the random access.

12. The network device of claim 11, wherein the first-type terminal device and the second-type terminal device are divided according to at least one of a positioning capability or a timing advance pre-compensation capability.

13. The network device of claim 11, wherein the configuration information specifically indicates that the first-type terminal device and the second-type terminal device respectively correspond to different uplink carriers.

14. The network device of claim 13, wherein the configuration information comprises a first uplink non-anchor carrier list and a second uplink non-anchor carrier list, uplink non-anchor carriers in the first uplink non-anchor carrier list being used for the first-type terminal device to initiate the random access, and uplink non-anchor carriers in the second uplink non-anchor carrier list being used for the second-type terminal device to initiate the random access.

15. The network device of claim 13, wherein the configuration information further comprises a plurality of first parameters, wherein the plurality of the first parameters respectively characterize probabilities that the first-type terminal device or the second-type terminal device uses a random access resource for the uplink anchor carrier at different coverage levels, and the plurality of the first parameters correspond to the coverage levels one to one.

16. The network device of claim 13, wherein the configuration information further comprises first indication information for indicating that the uplink anchor carrier is used for the first-type terminal device or the second-type terminal device to initiate the random access.

17. The network device of claim 11, wherein the configuration information specifically indicates that the first-type terminal device and the second-type terminal device respectively correspond to different random access resources for an uplink carrier; and wherein the configuration information is specifically used to configure a first random access resource for the uplink carrier and a second random access resource for the uplink carrier, the first random access resource being used for the first-type terminal device to initiate the random access, and the second random access resource being used for the second-type terminal device to initiate the random access.

18. The network device of claim 17, wherein the configuration information further comprises a plurality of second parameters and a plurality of third parameters, the plurality of the second parameters respectively characterizing probabilities of the first-type terminal device using a random access resource for the uplink anchor carrier at different coverage levels, the plurality of the third parameters respectively characterizing probabilities of the second-type terminal device using the random access resource for the uplink anchor carrier at different coverage levels, and the plurality of the second parameters and the plurality of the third parameters both being in one-to-one correspondences with the coverage levels.

19. A terminal device, comprising:

a processor, a memory, a receiver and an interface for communicating with a network device;

wherein the memory stores computer executable instructions; and the processor executes the computer executable instructions stored in the memory, to perform operations comprising:

receiving configuration information from a network device, wherein the configuration information indicates a random access resource for an uplink carrier corresponding to a first-type terminal device and a random access resource for an uplink carrier corresponding to a second-type terminal device; and initiating random access based on the configuration information, wherein the uplink carrier comprises an uplink anchor carrier and an uplink non-anchor carrier, and wherein initiating the random access based on the configuration information comprises:

determining a set of available random access resources for the uplink carrier according to a terminal type of the terminal device and the configuration information;

determining a first probability of selecting to use a random access resource for the uplink anchor carrier and a second probability of selecting to use a random access resource for the uplink non-anchor carrier; and selecting, according to the first probability and the second probability, a random access resource for the uplink carrier from the set of the available random access resources for the uplink carrier to initiate the random access.

* * * * *